United States Patent
Sim et al.

(10) Patent No.: US 7,680,556 B2
(45) Date of Patent: Mar. 16, 2010

(54) METHOD FOR DATA COLLECTION DURING MANUFACTURING PROCESSES

(75) Inventors: Boon Hong Sim, Singapore (SG); Ping Zhou, Singapore (SG)

(73) Assignee: TECH Semiconductor Singapore Pte. Ltd., Singapore (SG)

(*) Notice: Subject to any disclaimer, the term of this patent is extended or adjusted under 35 U.S.C. 154(b) by 1519 days.

(21) Appl. No.: 10/988,805

(22) Filed: Nov. 15, 2004

(65) Prior Publication Data

US 2006/0106921 A1    May 18, 2006

(51) Int. Cl.
G05B 23/02 (2006.01)
G05B 15/00 (2006.01)
G05B 11/01 (2006.01)
G06F 19/00 (2006.01)
G06F 11/00 (2006.01)
H04Q 5/22 (2006.01)
H04J 3/16 (2006.01)
H04J 3/22 (2006.01)

(52) U.S. Cl. ............ 700/121; 370/466; 370/467; 702/188; 340/3.51; 340/10.1; 700/1; 700/17; 700/18; 700/19; 700/20

(58) Field of Classification Search ............ 700/121, 700/1, 17, 18, 19, 20; 702/188; 370/466, 370/467; 340/3.51, 10.1
See application file for complete search history.

(56) References Cited

U.S. PATENT DOCUMENTS

| 6,070,196 A | 5/2000 | Mullen, Jr. ............ 709/250 |
| 6,208,904 B1 | 3/2001 | Mullen, Jr. ............ 700/9 |
| 6,532,434 B1 | 3/2003 | West ............ 702/187 |
| 6,535,783 B1* | 3/2003 | Miller et al. ............ 700/121 |
| 6,546,508 B1 | 4/2003 | Sonderman et al. ........... 714/48 |
| 6,556,881 B1 | 4/2003 | Miller ............ 700/108 |
| 6,708,074 B1 | 3/2004 | Chi et al. ............ 700/121 |
| 6,721,618 B2 | 4/2004 | Baek et al. ............ 700/121 |
| 6,725,402 B1 | 4/2004 | Coss, Jr. et al. ........... 714/48 |
| 6,842,660 B2* | 1/2005 | Tripathi et al. ............ 700/121 |
| 7,206,655 B2* | 4/2007 | Lee et al. ............ 700/121 |
| 2003/0083754 A1* | 5/2003 | Tripathi et al. ............ 700/2 |
| 2004/0040001 A1 | 2/2004 | Miller et al. ............ 716/4 |

FOREIGN PATENT DOCUMENTS

WO    WO 01/52320 A    7/2001

* cited by examiner

*Primary Examiner*—Ronald D Hartman, Jr.
(74) *Attorney, Agent, or Firm*—Saile Ackerman LLC; Stephen B. Ackerman (57) ABSTRACT

The present invention discloses a new data collection method employed by a middle layer between the host and the equipment, which improves the speed and consistency of data collection. The middle layer incorporated with the proposed data collection method functions as a data format converter as well as a data processor/classifier, which helps to filter and format messages before delivering data to the host or equipment. The proposed data collection method enables the middle layer to perform local reply, local data sampling, and group data polling, thus relieving processing resources of both the equipment and the host. This allows implementation of APC on older wafer fabrication processes using old equipment.

45 Claims, 11 Drawing Sheets

FIG. 1a

Group Object 1 — 100
- Group ID (1)
- Message Destination (host 1)
- Sampling Rate (1 second)
- SVID list (e.g. 1,2,3,4)

Group Object 2 — 100
- Group ID (2)
- Message Destination (host 2)
- Sampling Rate (2 seconds)
- SVID list (e.g. 3,4,5,6)

Group Object 3 — 100
- Group ID (3)
- Message Destination (host 1)
- Sampling Rate (1 second)
- SVID list (e.g. 1,5,7,8)

METHOD FOR DATA COLLECTION DURING MANUFACTURING PROCESSES

BACKGROUND OF THE INVENTION (1) Field of the Invention

The invention relates to a method for data collection, and more specifically to a method for data collection during manufacturing processes that will result in relief of load on the host and on the manufacturing equipment.

(2) Description of the Prior Art

Implementing advanced process control (APC) has imposed a heavy load on both the host system and the equipment controller. In APC, a model is built to analyze time series data in real-time and to generate an alert when a fault is detected. The reliability of the control model depends on the accuracy and the consistency of the data collected.

Time series data can be collected in two ways:

1) Trace data—A method of data collection in which equipment is set up to send a pre-defined set of data at a preset interval. The minimum trace interval is one second using the trace data collection method.

2) Polling—A method of data collection in which the host is set up to request a pre-defined set of data at a preset interval. Using this method, a sub-second interval (0.5 second) can be achieved.

Both of the above-mentioned data collection methods impose loading on either the equipment (trace data) or the host (polling) when time series data collection is enabled. The data collection job takes up processing resources of either the equipment or the host.

U.S. Pat. No. 6,070,196 to Mullen, Jr. discloses a protocol converter controller having distributed architecture. U.S. Pat. No. 6,532,434, to West describes a modular data sensing and logging system. A control module interfaces between a host computer and data acquisition modules. International Patent Publication WO 01/52320 A2 to Coss, Jr. et al describes an Advanced Process Control (APC) system that includes a method for an operator to request trace data reports from a fabrication tool via a report generator interface. U.S. Patent Application 2003/0083754 A1 to Tripathi et al shows a device and method for communicating data in a process control system. U.S. Pat. No. 6,208,904 to Mullen, Jr. teaches a general purpose data communications protocol converter. U.S. Pat. No. 6,708,074 to Chi et al discloses a generic interface builder used to add tools or systems to a centralized manufacturing system. U.S. Pat. No. 6,721,618 to Baek et al teaches a system and method for automatically generating SECS messages for a process control system. U.S. Pat. No. 6,556,881 to Miller shows an apparatus and a process for integrating real-time fault detection into an APC framework. U.S. Patent Application 2004/0040001 to Miller et al teaches a method to predict device electrical parameters during fabrication. U.S. Pat. No. 6,535,783 to Miller et al teaches processing of sensor data from a process tool in an APC system. U.S. Pat. No. 6,725,402 to Coss, Jr. et al and U.S. Pat. No. 6,546,508 to Sonderman et al disclose a method and apparatus for fault detection of a processing tool in an APC system.

SUMMARY OF THE INVENTION

It is the primary objective of the present invention to improve the speed and consistency of data collection in a process control system.

Another objective of the present invention is to provide a middle layer between the host and the equipment, which improves the speed and consistency of data collection in a process control system.

A further objective of the invention is to provide a middle layer between the host and the equipment wherein the middle layer functions as a data format converter and a data processor/classifier.

A still further objective of the invention is to provide a middle layer between the host and the equipment wherein the middle layer filters and formats messages before delivering data to the host or equipment.

Another objective is to provide a middle layer between the host and the equipment to perform auto-reply, local data sampling (single group), and group data polling (multiple group), thus relieving processing resources of both the equipment and the host.

Yet another objective is to provide a middle layer between the host and the equipment to provide auto-reply messages to equipment to relieve processing resources of the host.

Yet another objective of the invention is to provide message routing and filtering for a plurality of applications and hosts.

The present invention discloses a new data collection method employed by a middle layer between the host and the equipment, which improves the speed and consistency of data collection. The middle layer incorporated with the proposed data collection method functions as a data format converter as well as a data processor/classifier, which helps to filter and format messages before delivering data to the host or equipment. The proposed data collection method enables the middle layer to perform auto-reply, local data sampling, and group data polling, thus relieving processing resources of both the equipment and the host. This allows implementation of APC on older wafer fabrication processes using old equipment.

DETAILED DESCRIPTION OF THE INVENTION

Advanced process control (APC) implementation is fast gaining acceptance in semiconductor manufacturing as many manufacturers begin to understand its potential for achieving better control and higher yield. One of the critical factors that would determine the success of APC implementation is to ensure an accurate real-time data collection capability from the equipment. The APC data collection requirement has put much pressure on the equipment controller and host server. System integrators have often encountered difficulties in integrating equipment due to low performance of the equipment controller. This is especially true for older model equipment. Using the conventional data collection method has usually limited equipment controller performance or host performance. Upgrading of the equipment controller and host system is usually not an option since it can be very expensive.

Furthermore, traditional trace data collection methods involve configuring the equipment to send trace data periodically and automatically to the host application. However, trace data messages are considered by the equipment controller to be of a low priority. Thus, sending the trace data messages will be delayed when the equipment is busy or loaded with other tasks. In addition, traditional methods allow messages to be sent to a default communication host. The default host application is responsible for re-directing all the messages received by the default host to other applications. This inevitably reduces data processing capacity of the host.

Figure 1A:
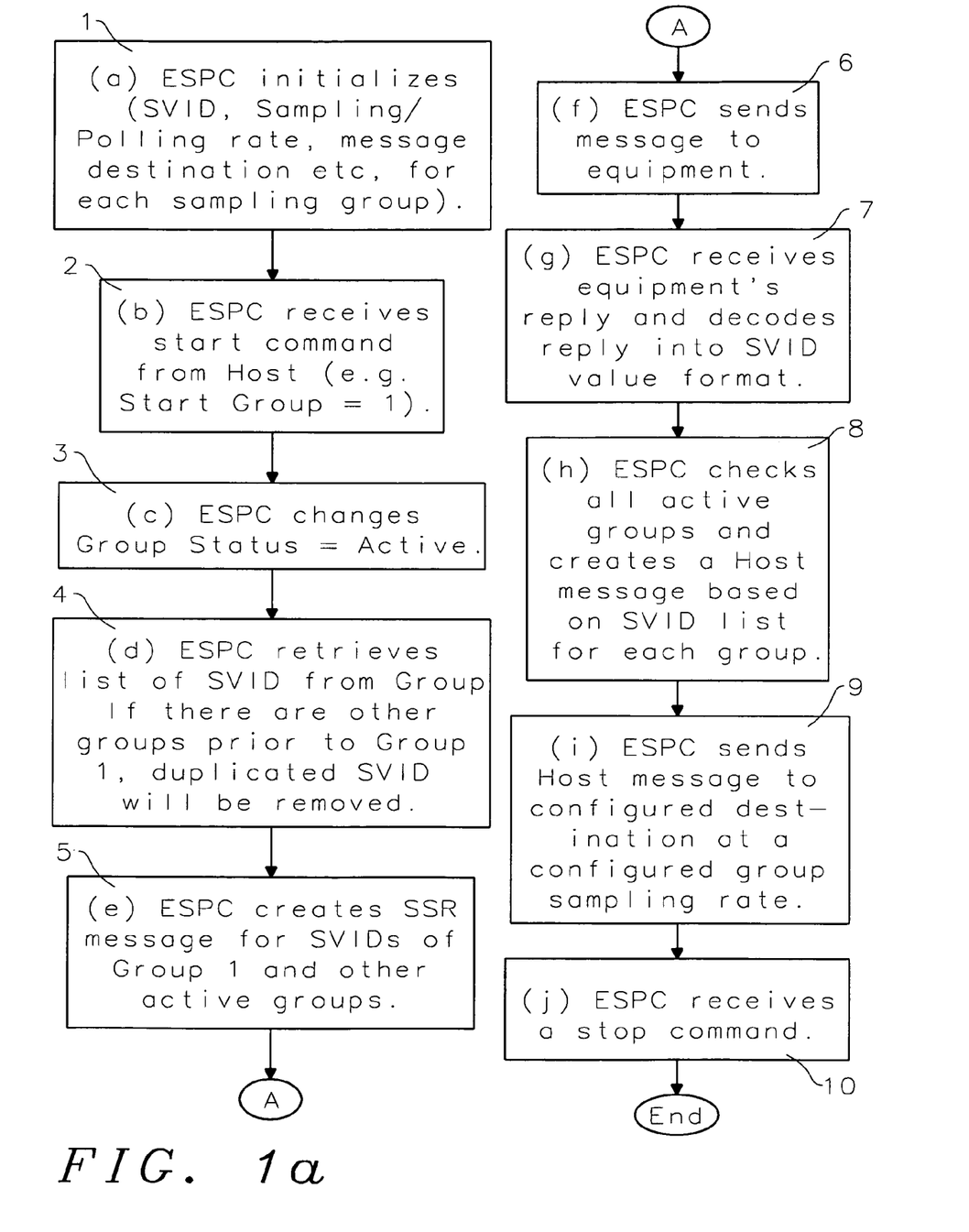
FIG. 1a shows a flowchart of the method of data collection of the present invention.
Figure 1B:
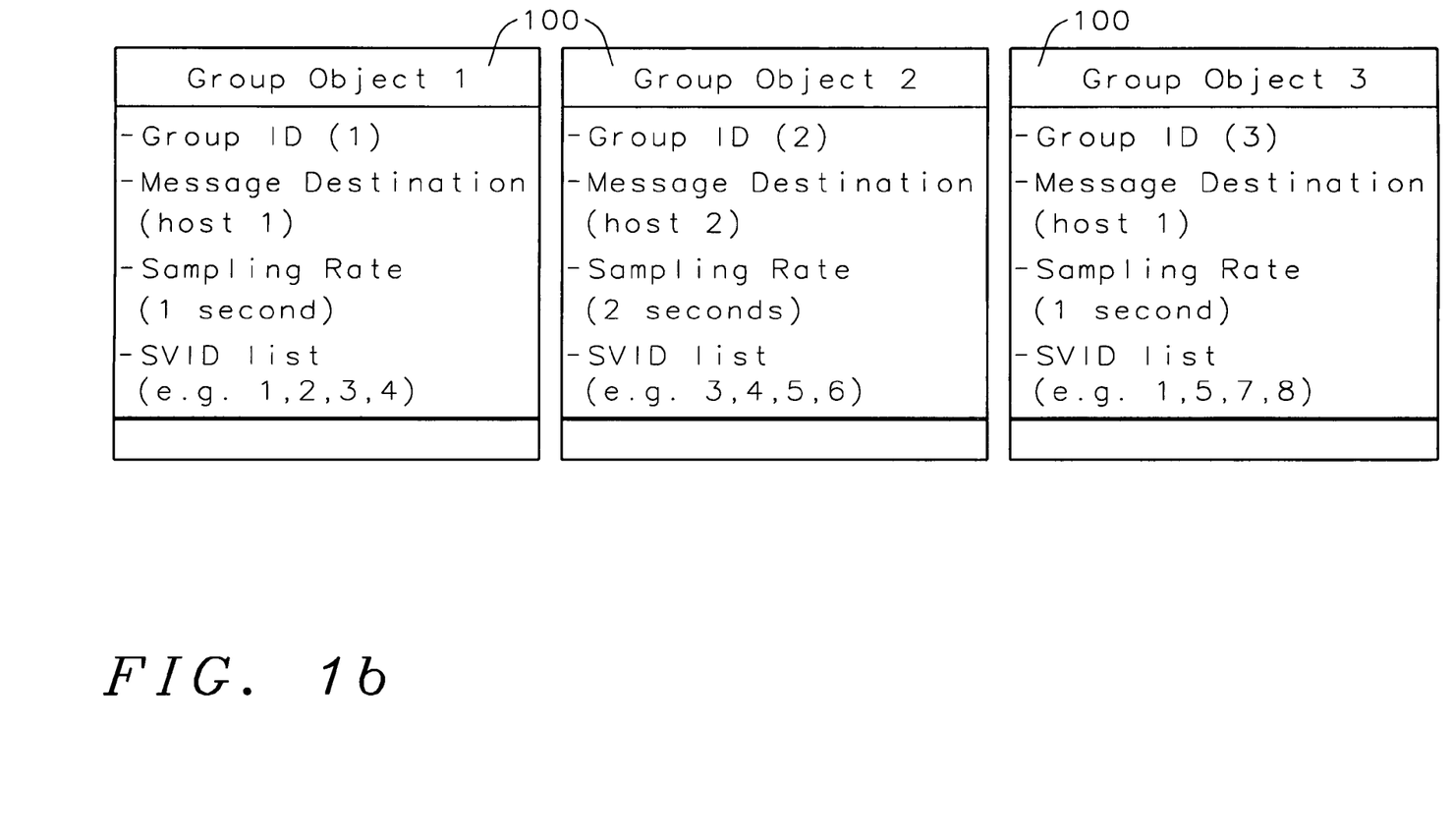
FIG. 1b shows a schematic chart of polling group storage of the present invention.

The present invention aims to solve the above-mentioned issues with the traditional data collection method by employing a middle data processing layer, herein named the Enhanced Software Protocol Converter (ESPC). ESPC employs Selected Equipment Status Request (SSR) to retrieve data from equipment, regardless of group polling or local data sampling (treated as single group polling). The SSR is configured according to a standard such as defined by the Semiconductor Equipment and Materials International (SEMI) Equipment Communication Standard (SECSII). According to the present invention, prior to activating data polling, the ESPC is initialized either by pre-configuring the ESPC in a configuration file or by sending a defined command to the ESPC. Referring to FIG. 1a, the initialization process (step 1) involves identifying the Equipment Status Variables (SVID) that are of interest, the sampling or polling rate, the message destination, and so on, for each sampling group. During this initialization process, information on each group will be stored in the ESPC memory as objects 100, as shown in FIG. 1b. It is important to note that each group ID must be unique as it is used to identify a particular polling group in the ESPC.

Figure 1C:
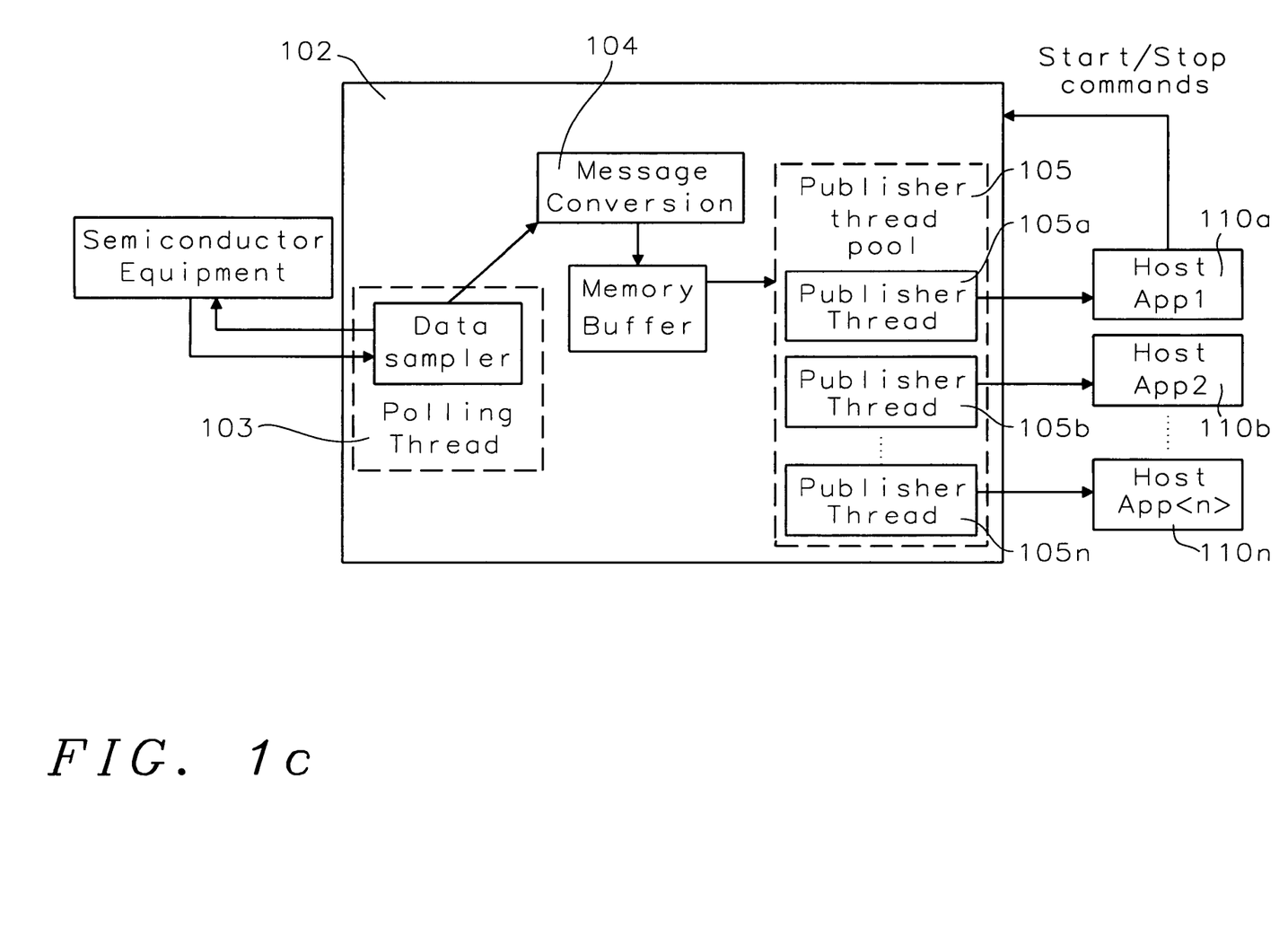
FIG. 1c shows a block diagram of local sampling of the present invention.

The invention implements a multi-thread programming design to achieve the high speed requirement. There are four thread systems running as shown in FIG. 1c. A main thread 102 controls the entire data collection process. A polling thread 103 handles the communication protocol between the ESPC and the equipment. A message conversion thread 104 is responsible for the formatting of messages from equipment format to host format and vice versa. A publishing thread pool 105 is responsible for sending out data to the host at the requested interval.

The data collection process begins after the ESPC receives a start command from the host application (step 2 in FIG. 1a). The start command is usually group based; e.g. start group=1. Upon receiving the command, the ESPC will change the group status to active (step 3) and retrieve the list of SVID's from that particular group (step 4) (as shown in FIG. 1b). If other groups have been activated for data sampling prior to the activation of group 1, for example, duplicate SVID's will be removed. All remaining SVID's will be combined to create a SSR message to retrieve data from the equipment (step 5). Referring to FIG. 1b, for example, if both groups 1 and 2 are started, the SSR message will contain only SVID 1, 2, 3, 4, 5, 6. Duplicated SVID's 3 and 4 will only appear once in the SSR message.

The polling thread 103, on receiving the start poll signal from the main thread 102, will send out the SSR message at the specified sampling rate (step 6). Upon receiving the SSR message, the equipment will process the message and send out a reply containing the requested status values. The ESPC will decode the message from the equipment based on the defined SVID value format (step 7), store the data in a temporary buffer, and update a flag to signal that new data has been received. The polling thread continues to wait for the next interval timeout before proceeding to request a new set of data.

The start command also activates the publishing threads 105. There will be one thread (105a, 105b, ..., 105n) started for each host 110a, 110b, ..., 110n. At the defined publishing interval, ESPC will first check for the availability of new data. This is done by examining the data available flag set by the polling thread. If this flag is set, ESPC will start to process all active groups (step 8). For each active group, the respective SVID values are read from the temporary buffer and are configured into the host recognizable message format. The message is then published to the designated hosts (step 9).

When ESPC receives a stop command for any group (step 10), it will change the status of the respective group to inactive and remove any SVID that is required only by this group. The SSR message is then reconstructed before the next polling message is sent to the equipment. When a stop command for all groups is received, all groups will be set to inactive and the SSR list will be empty. Both the polling and publishing threads will be put into a suspended mode.

Figure 2A:
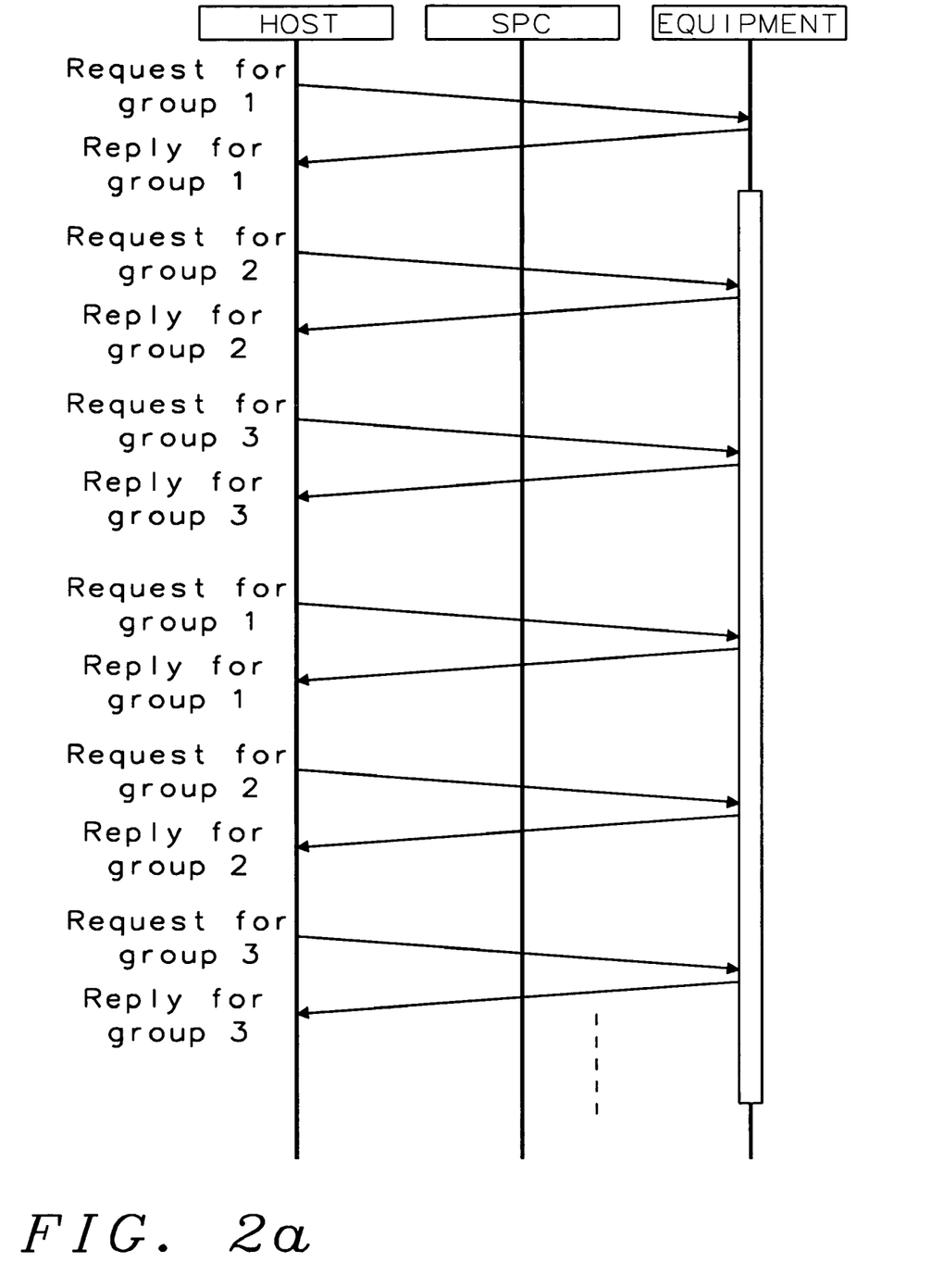
FIG. 2a shows a schematic diagram of traditional host polling of the prior art.
Figure 2B:
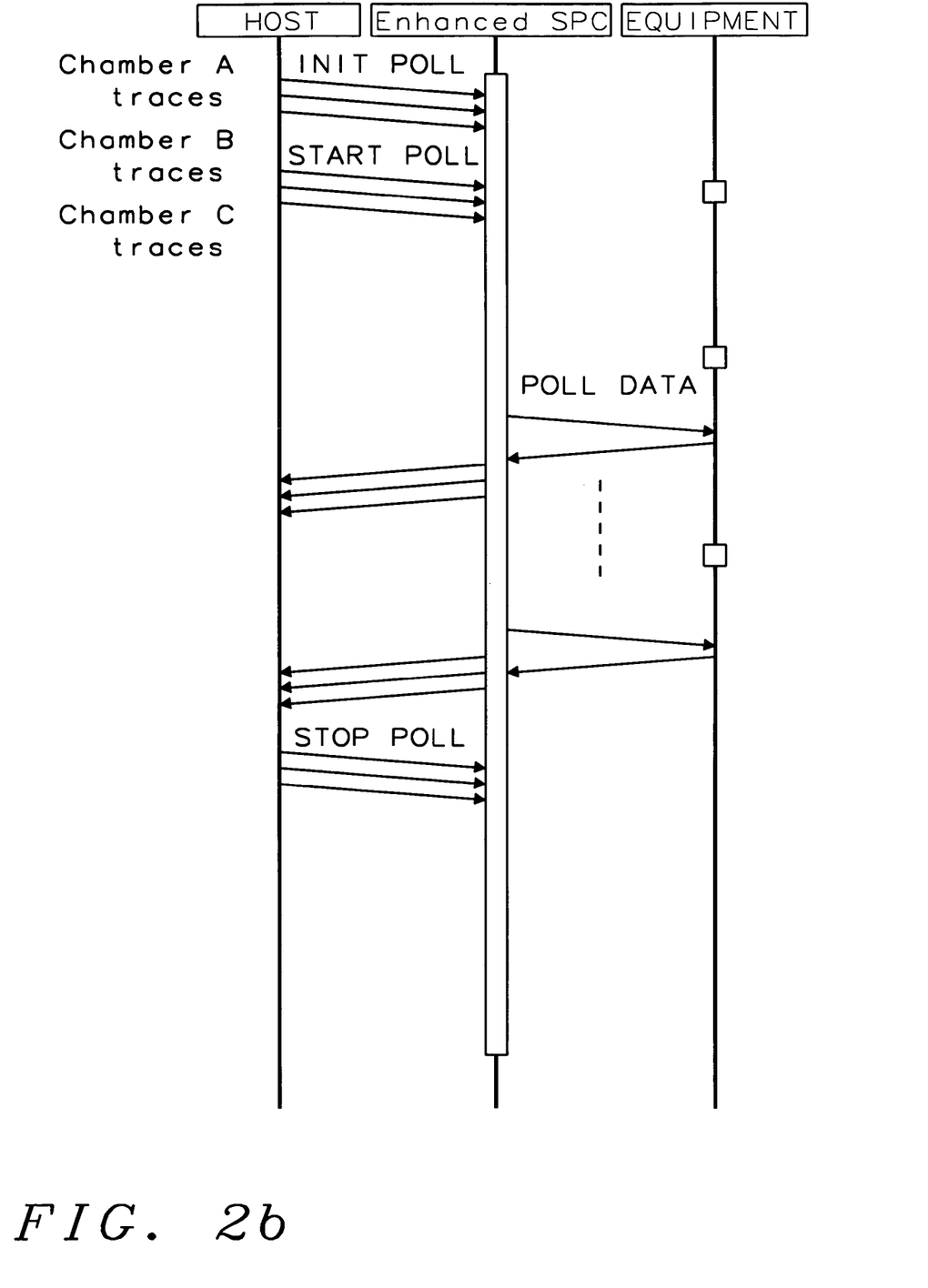
FIG. 2b shows a schematic diagram of the polling method of the present invention.

The present invention helps to enhance the data processing capability of the host by reducing the host loading. This can be achieved by reducing the number of messages required to be sent by the host. Instead of sending a request message to equipment periodically for every group, with the implementation of the present invention, the host only needs to send three different command messages for each sampling group ESPC. These command messages are: 1) the initialization command which initializes the group objects (this command is optional if the group is configured in ESPC directly), 2) the start command, and 3) the stop command. FIGS. 2a and 2b show a comparison between traditional host polling (FIG. 2a) and the present invention (FIG. 2b).

Figure 3A:
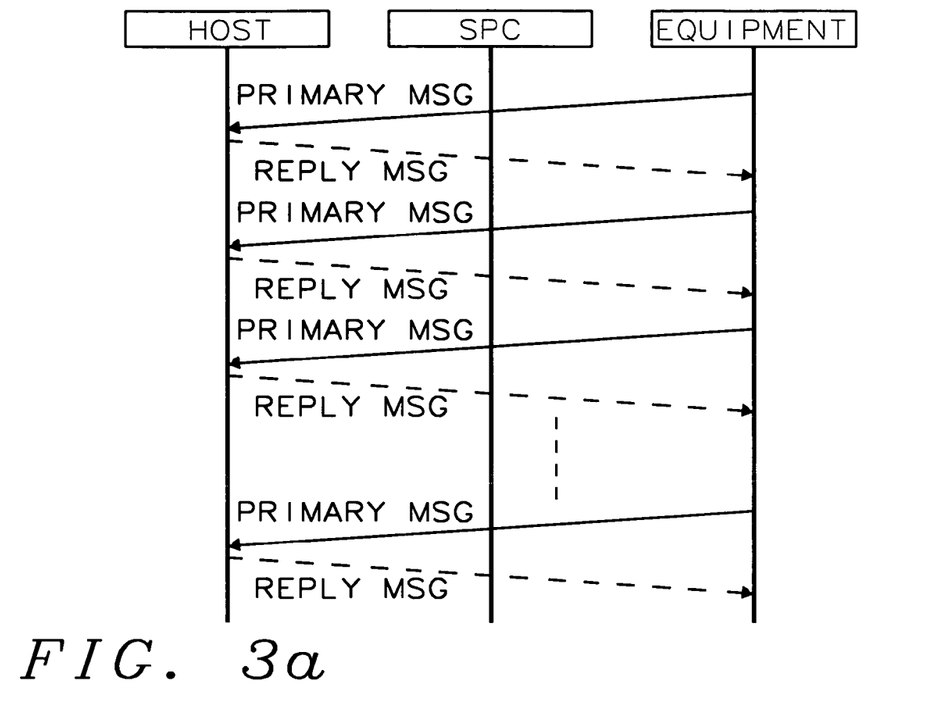
FIG. 3a shows a schematic diagram of a software protocol converter of the prior art.

In one embodiment of the present invention, ESPC incorporates a message auto-reply function that further facilitates reduction of load from the host. Message auto-reply is suitable for primary messages from equipment, e.g. alarm messages and events messages, etc. Such reply messages are for confirmation of receiving messages and are normally in a standard format. Auto-reply is achieved by modifying the W bit in the block header, which indicates whether or not the sender of a primary message expects a reply. FIG. 3a illustrates the activity diagram of the traditional auto-reply cycle.

Figure 3B:
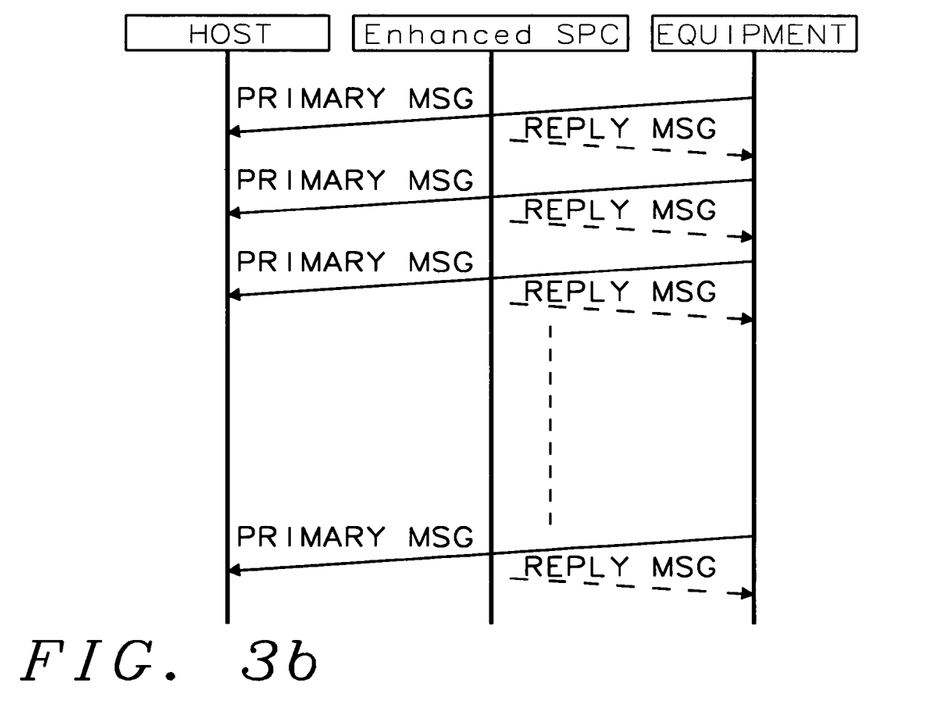
FIG. 3b shows a schematic diagram of the enhanced software protocol converter of the present invention.
Figure 3C:
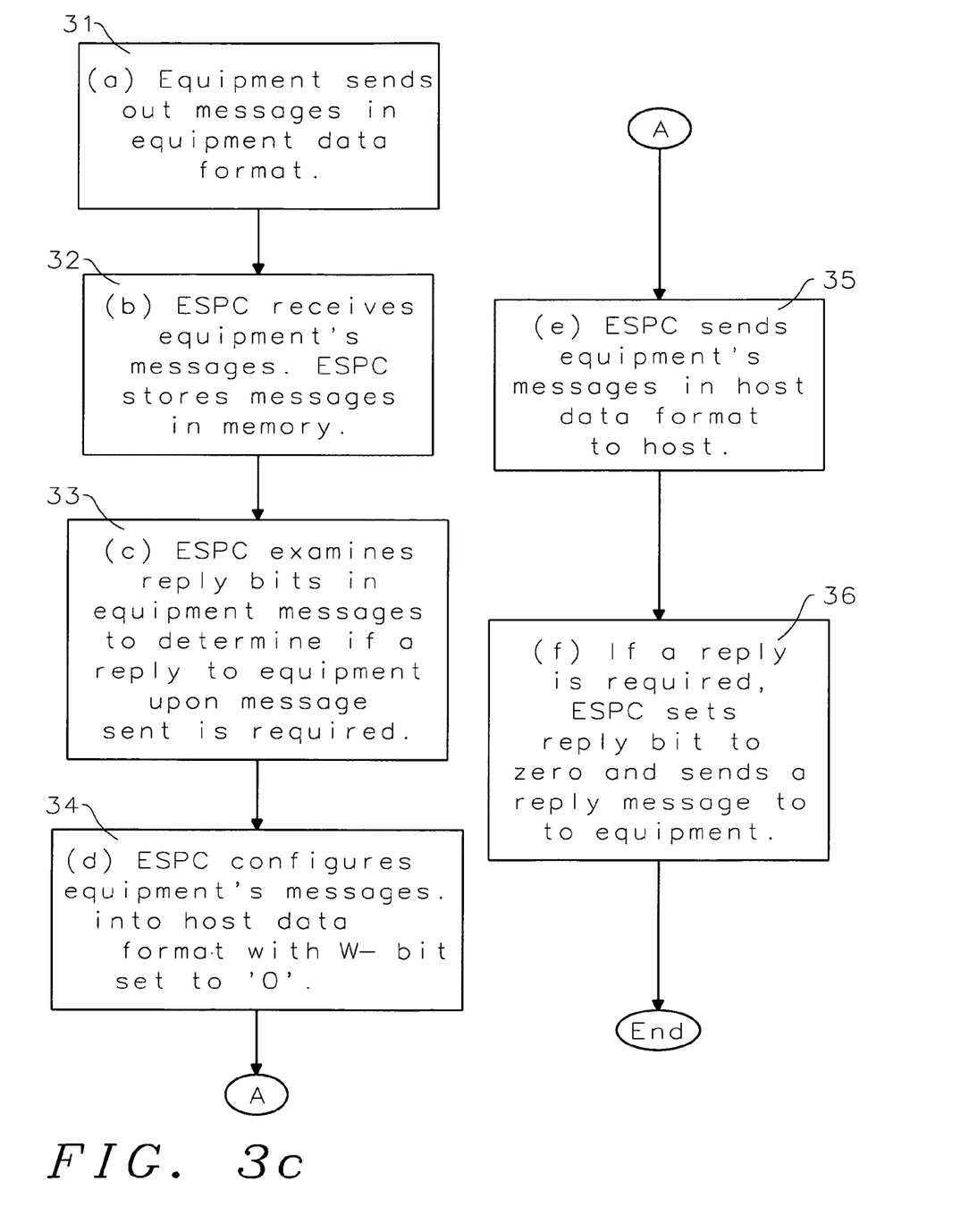
FIG. 3c shows a flowchart of the auto reply process of the present invention.

Referring to FIGS. 3b and 3c, the auto-reply function of the present invention is illustrated. ESPC will check every primary message from equipment. If the message is configured such that auto-reply is required, ESPC will set the message's W bit to zero before forwarding the message to the host so that the host will not need to send a reply. At the same time, ESPC will form a standard reply message and send it back to the equipment.

In more detail as shown in the flowchart in FIG. 3c, in step 31, the equipment sends out messages. In step 32, ESPC receives messages and stores them in memory. In step 33, ESPC examines the reply bits in the equipment messages. ESPC configures the equipment's messages into host data format (step 34). ESPC sends the messages to the host (step 35). Finally, if a reply is required, ESPC sets the reply bit to zero (step 36) and sends a reply message to the equipment.

Figure 4A:
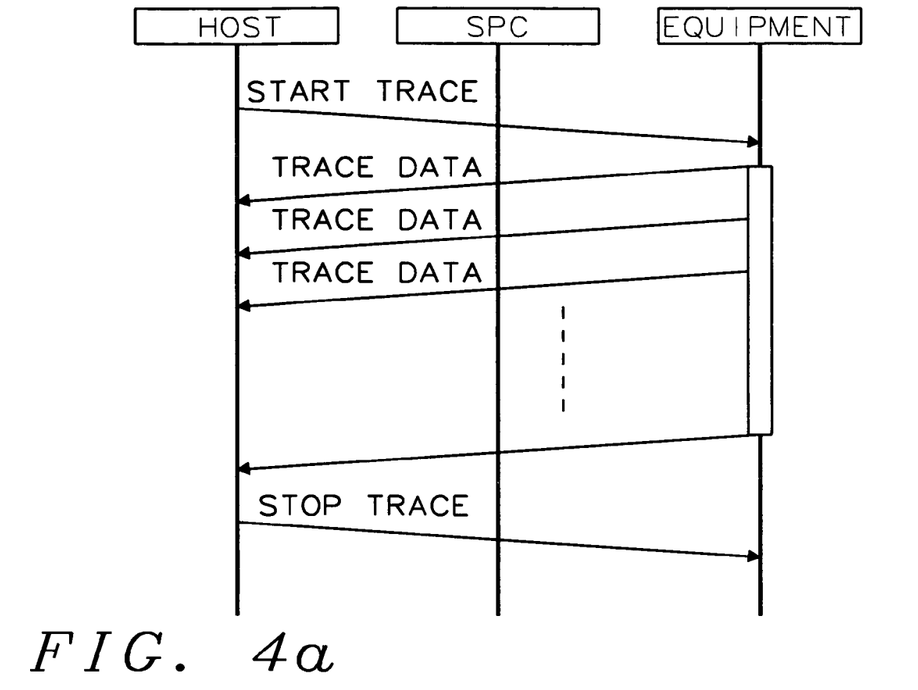
FIG. 4a shows an activity diagram of local data sampling of the prior art.

FIG. 4a shows an activity diagram for traditional local data sampling. Normally, a host request consists of types of data to be collected and the time interval to collect such data. In a typical time series data collection implementation, the host will send a trace initiate command with the required SVID's and sampling rate. Upon receiving this command, the equipment stores the required SVID's in memory and starts a process to publish the data to the host at the requested interval (minimum 1 second). This task in most equipment controller operating systems is considered as a lower priority task. When the equipment controller is busy with processing operations, the data publishing is usually interrupted. This results in inconsistency in the data collection interval. In some cases, equipment performance can also be affected when multiple traces are turned on at the same time, resulting in lower throughput. This is not an acceptable condition.

Figure 4B:
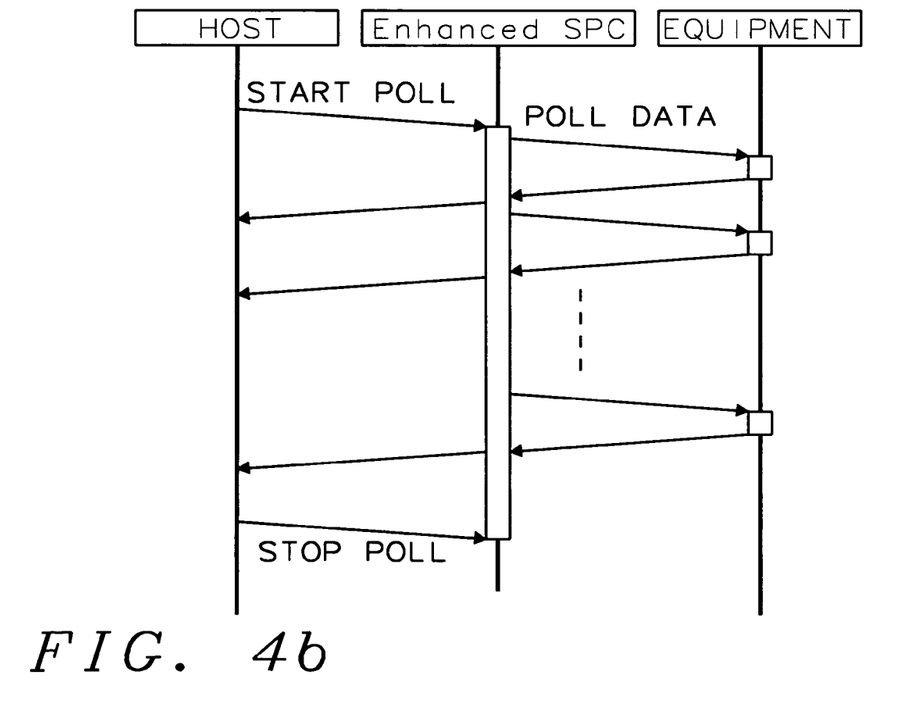
FIG. 4b shows an activity diagram of local data sampling of the present invention.

In the implementation of the present invention, the middle layer ESPC helps to relieve the load on the equipment. This is illustrated in the activity diagram in FIG. 4b and in the flowchart of FIG. 4c. The host request is sent to the ESPC instead of to the equipment. The ESPC processes the request, starts a timer to collect data from the equipment, and distributes the information to the host at the required interval. The equipment controller is relieved from this task and will have more resources for the actual processing work.

Figure 4C:
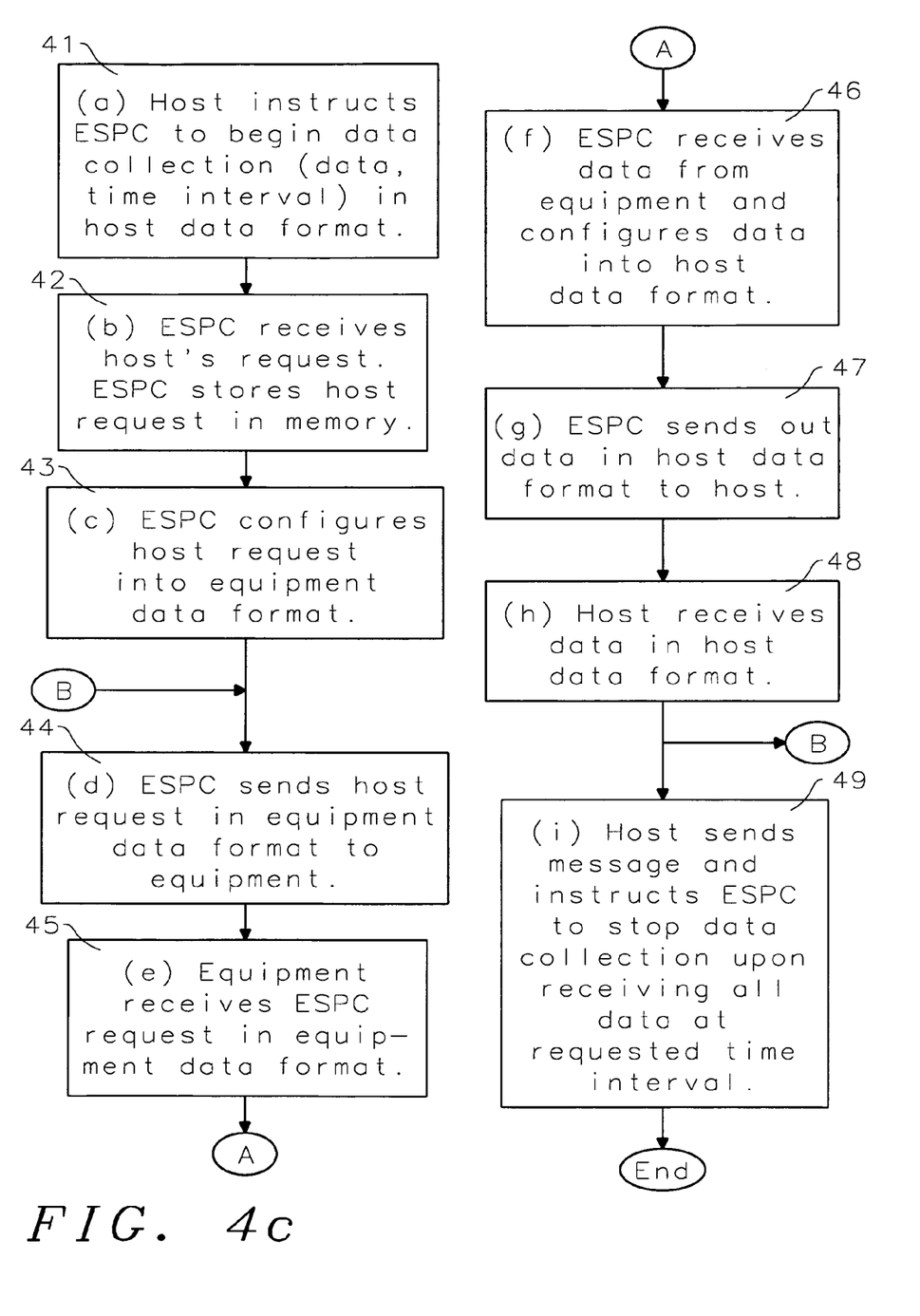
FIG. 4c shows a flowchart of the local data sampling process of the present invention.

In more detail, referring to FIG. 4c, the host instructs the ESPC to begin data collection (step 41). The ESPC receives the host request and stores it in memory (step 42). The ESPC configures the request into the proper format for the equipment (step 43) and sends the data collection request to the equipment (step 44). The equipment receives the data request (step 45), retrieves the data, and sends the data to the ESPC. The ESPC configures the data into the host format (step 46) and sends the data to the host (step 47). The host receives the data (step 48). Steps 44 through 48 are repeated a particular number of times or until a stop signal is received from the host. When the host is satisfied that data collection is complete, it sends a stop message to the ESPC (step 49).

Figure 5A:
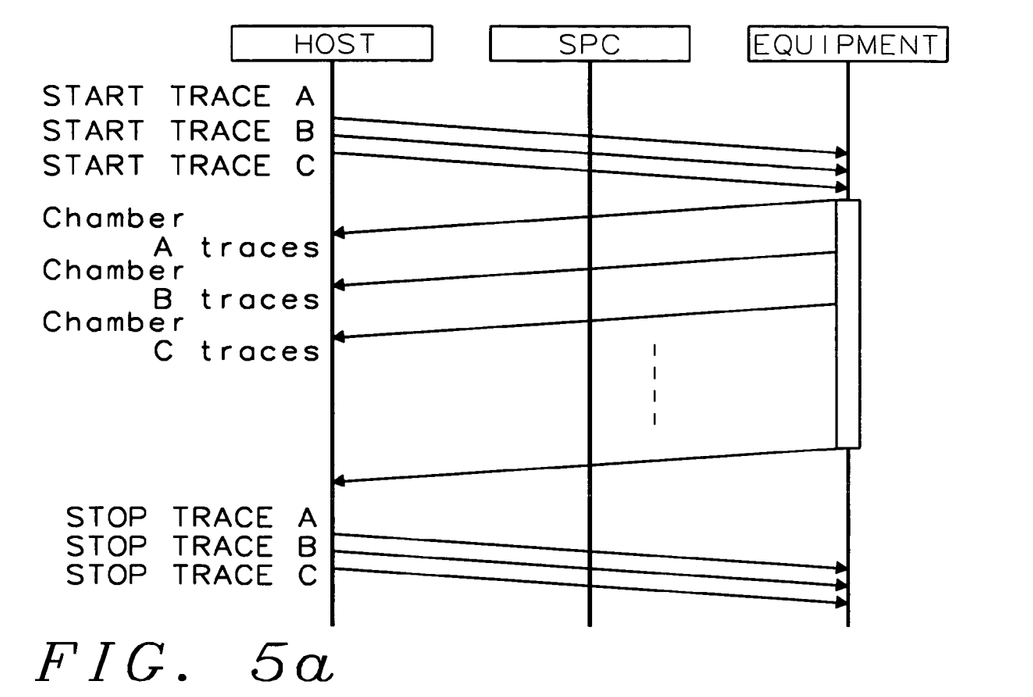
FIG. 5a shows an activity diagram of group data polling of the prior art.
Figure 5B:
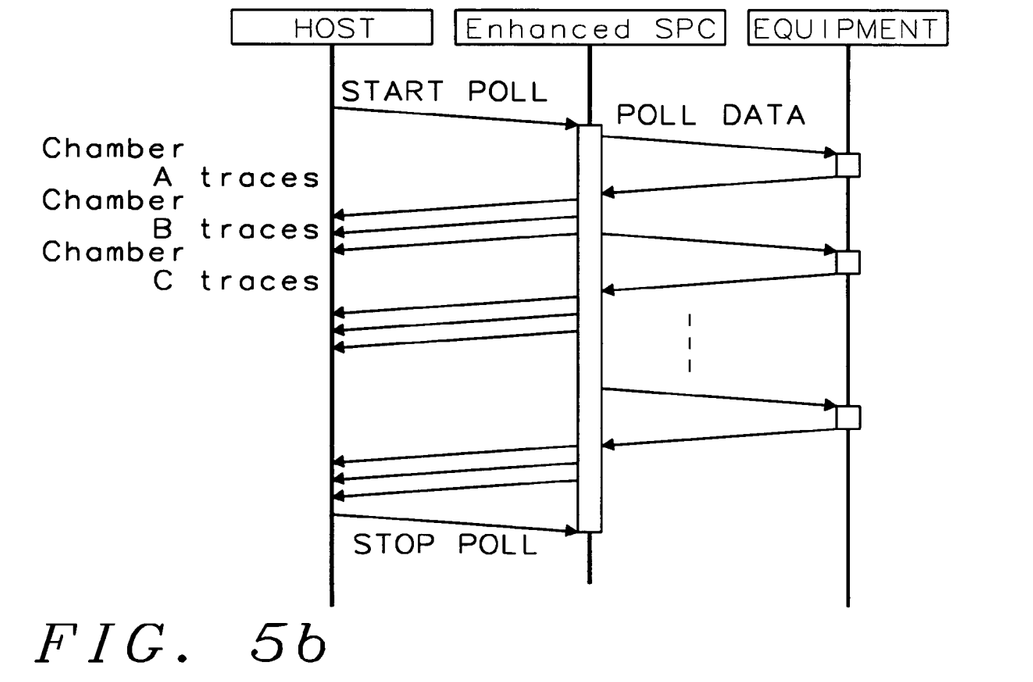
FIG. 5b shows an activity diagram of group data polling of the present invention.

For group polling, loading of the equipment is greatly reduced by the implementation of the present invention. Only one request message is to be sent to the equipment regardless of the number of polling groups. FIG. 5a illustrates an activity diagram of traditional group data polling. FIG. 5b is an activity diagram of group data polling of the present invention, as shown in more detail in the flowchart of FIG. 5c. The ESPC receives and sends out to the equipment the host's requests. Upon receiving a request, the equipment sends out one data message to the ESPC. The ESPC then collects all data received from the equipment and classifies the data into groups. In the traditional method, the equipment would have to send multiple data messages to the host. The present invention effectively reduces the message traffic between the equipment and the host.

Figure 5C:
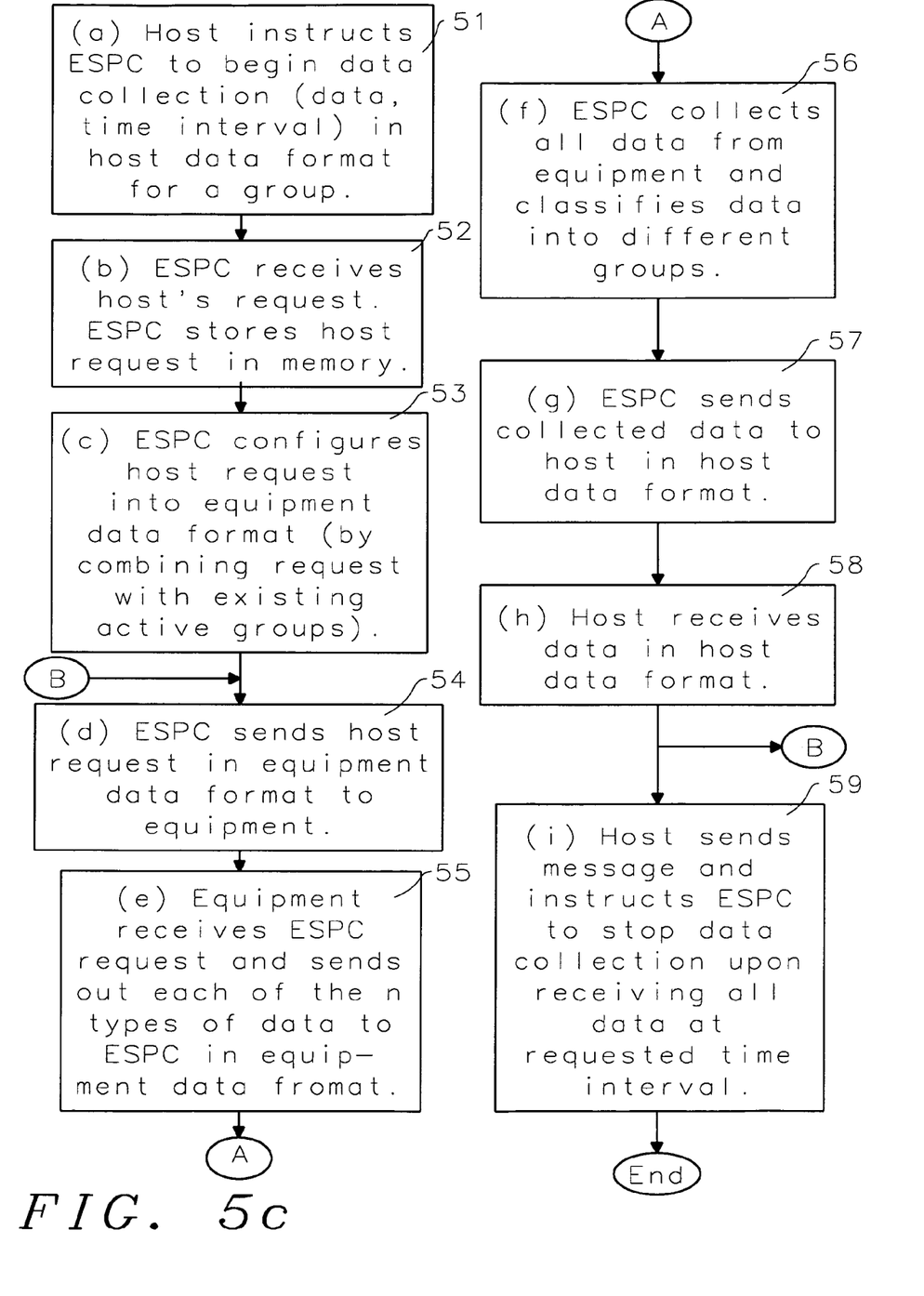
FIG. 5c shows a flowchart of the group data polling process of the present invention.

In more detail, referring to FIG. 5c, the host instructs the ESPC to begin data collection (step 51). The ESPC receives the host's request and stores it in memory (step 52). The ESPC configures the host's request into equipment data format (step 53) by combining the request with existing active groups and sends the request to the equipment (step 54). The equipment receives the request and sends out each of the types of data requested to the ESPC (step 55). The ESPC collects all of the data and classifies it into the groups as set up by the host (step 56) and sends the data to the host (step 57). The host receives the data (step 58). Steps 54 through 58 are repeated a particular number of times until all collection groups are stopped by the host. When the host is satisfied that data collection is complete, it sends a stop message to the ESPC (step 59).

ESPC facilitates the integration of third party applications of the existing equipment with minimal impact to the current system. This is achieved by the built-in message routing and filtering capability. Applications such as APC usually require integration of the equipment for real-time data collection. Traditionally, these applications can send requests individually to the equipment and the equipment replies separately to the applications. This increases equipment loading. Alternately, one host application may have the capability to re-route the equipment message to other host applications which increases host loading. In the present invention, the ESPC provides a message routing and filtering function to avoid the above problems. Any application interested in equipment messages can register with ESPC by streams and functions, defined in SEMI SEC II standards, as well as by an application identifier. When the ESPC receives a primary message from equipment, it will retrieve stream and function and check against the list of subscriptions to find interested applications. ESPC will then publish the messages to each interested application.

The implementation of the present invention has the following advantages:
1) improves data collection speed and consistency during the manufacturing process,
2) enhances data collection and processing capability in an APC environment by relieving the processing resources of both equipment and host, and
3) enables equipment without tracing ability or with limited CPU resources to provide accurate and consistent data collection.

The ESPC of the present invention can be provided as a computer program product. The computer program can reside on any computer with the Microsoft® Windows® operating system (Windows® 2000, XP, 2003). The program is started as a Windows® services program that can be configured to be started automatically when the computer is started and run as a background process.

Although the preferred embodiment of the present invention has been illustrated, and that form has been described in detail, it will be readily understood by those skilled in the art that various modifications may be made therein without departing from the spirit of the invention or from the scope of the appended claims.

What is claimed is:

1. A method for collecting data from a plurality of processing equipment comprising:
    receiving from a host system a definition of sampling groups wherein said definition of each sampling group comprises a listing of equipment status variables for a piece of processing equipment, a sampling or polling rate, and a message destination;
    receiving from a host system a request to collect data for one or more of said sampling groups; and
    thereafter, for each sampling group in said request, at said sampling or polling rate:
        formatting a request for said data;
        sending said formatted request to said piece of processing equipment;

thereafter receiving said data from said piece of processing equipment;
formatting said data received; and
sending said formatted data to said message destination.

2. The method of claim 1 wherein said receiving of said definition of sampling groups is in a configuration file.

3. The method of claim 1 wherein said receiving of said definition of sampling groups is as a command from said host system.

4. The method of claim 1 further comprising receiving from said host system a request to stop collecting data for one or more of said sampling groups.

5. The method of claim 1 wherein said formatting said request for said data comprises:
creating a message in a format suitable for said piece of processing equipment; and
including only one copy of each of duplicate process variables to be collected.

6. The method of claim 1 wherein said formatting said data received comprises:
creating a message in a format suitable for each host system; and
classifying said data received into sampling groups as requested by said host system.

7. The method of claim 1 wherein said sending said requested data to said message destination comprises sending said data at a requested time interval.

8. The method of claim 1 further comprising:
receiving primary messages from said pieces of processing equipment; and
sending said primary messages to each of a list of applications interested in said primary messages.

9. The method of claim 8 further comprising:
checking if each of said primary messages has an auto-reply option turned on;
formatting each of said primary messages into a format suitable for each of said interested applications;
setting to zero a reply bit in each of said formatted messages before sending said formatted messages to said interested applications; and
sending an auto-reply message to said piece of processing equipment for each of said messages having said auto-reply option turned on.

10. The method of claim 8 wherein said primary messages comprise alarm messages or events messages.

11. A semiconductor fabrication process control system comprising:
at least one host system which can request data and other information from at least one piece of processing equipment; and
an enhanced software protocol converter performing the functions:
receiving from said at least one host system a definition of sampling groups wherein said definition of each sampling group comprises a listing of equipment status variables for a piece of processing equipment, a sampling or polling rate, and a message destination;
receiving from said at least one host system a request to start collecting data for a particular sampling group wherein said request to start collecting data for a particular sampling group results in preparing sampling requests to be sent to said piece of processing equipment at said sampling or polling rate;
receiving from said at least one host system a request to stop collecting data for a particular sampling group wherein said request to stop collecting data for a particular sampling group results in ceasing to prepare sampling requests to be sent to said piece of processing equipment; and
for each said sampling group for which a request to start collecting data has been received and for which a request to stop collecting data has not been received, at said sampling or polling rate:
converting said sampling request into a format suitable for said at least one piece of processing equipment;
sending said formatted sampling request to said at least one piece of processing equipment;
receiving data from said at least one piece of processing equipment;
converting said data from said at least one piece of processing equipment into a format suitable for said at least one host system; and
sending said formatted data to said at least one host system.

12. The system of claim 11 wherein said receiving of said definition of sampling groups is in a configuration file.

13. The system of claim 11 wherein said receiving of said definition of sampling groups is as a command from said host system.

14. The system of claim 11 wherein said sending said formatted data to said at least one host system comprises sending said data to said message destination.

15. The system of claim 11 wherein said converting said data from said at least one host system into a format suitable for said at least one piece of processing equipment comprises:
creating a message in a format suitable for said piece of processing equipment; and
including only one copy of each of duplicate process variables to be collected.

16. The system of claim 11 wherein said converting said data from said at least one piece of processing equipment into a format suitable for said at least one host system comprises:
creating a message in a format suitable for each host system; and
classifying said data received into groups as requested by said host system.

17. The system of claim 11 wherein said sending said formatted data to said at least one host system comprises sending said data at a requested time interval.

18. The system of claim 11 wherein said enhanced software protocol converter also performs the functions comprising:
receiving primary messages from said at least one piece of processing equipment; and
sending said primary messages to each of a list of applications interested in said primary messages.

19. The system of claim 18 wherein said enhanced software protocol converter also performs the functions comprising:
checking if each of said primary messages has an auto-reply option turned on;
formatting each of said primary messages into a format suitable for each of said interested applications;
setting to zero a reply bit in each of said formatted messages before sending said formatted messages to said interested applications; and
sending an auto-reply message to said piece of processing equipment for each of said messages having said auto-reply option turned on.

20. The system of claim 18 wherein said primary messages comprise alarm messages or events messages.

21. A computer program product comprising:
  a computer readable code means residing on a computer, said means causing said computer to communicate data between a plurality of devices in a process control system, said computer readable code means in said computer program product comprising:
  computer readable program code means causing said computer to receive data collection requests from a plurality of host systems;
  computer readable program code means causing said computer to format said data collection requests for a plurality of processing equipment;
  computer readable program code means causing said computer to send said formatted said data collection requests to said plurality of processing equipment;
  computer readable program code means causing said computer to receive data collection results from said plurality of processing equipment;
  computer readable program code means causing said computer to format said data collection results for said plurality of host systems;
  computer readable program code means causing said computer to send said formatted said data collection results to said plurality of host systems;
  computer readable program code means causing said computer to receive primary messages from said plurality of processing equipment;
  computer readable program code means causing said computer to send said primary messages to each of a list of applications interested in said primary messages;
  computer readable program code means causing said computer to check if each of said primary messages has an auto-reply option turned on;
  computer readable program code means causing said computer to format each of said primary messages into a format suitable for each of said interested applications;
  computer readable program code means causing said computer to set to zero a reply bit in each of said formatted messages before sending said formatted messages to said interested applications; and
  computer readable program code means causing said computer to send an auto-reply message to said processing equipment for each of said messages having said auto-reply option turned on.

22. The computer program product of claim 21 further comprising:
  computer readable program code means causing said computer to receive from said plurality of host systems a list of sampling groups requested.

23. The computer program product of claim 22 further comprising:
  computer readable program code means causing said computer to receive a definition of sampling groups wherein said definition of each sampling group comprises a listing of equipment status variables, a sampling or polling rate, and a message destination.

24. The computer program product of claim 23 wherein said means comprises a configuration file.

25. The computer program product of claim 23 wherein said means comprises a command from said host system.

26. The computer program product of claim 22 further comprising:
  computer readable program code means causing said computer to receive from said plurality of host systems a request to start collecting data for a sampling group.

27. The computer program product of claim 22 further comprising:
  computer readable program code means causing said computer to receive from said plurality of host systems a request to stop collecting data for a sampling group.

28. The computer program product of claim 21 wherein said computer readable program code means causing said computer to format said data collection requests for a plurality of processing equipment comprises:
  creating messages in formats suitable for said plurality of processing equipment; and
  including only one copy of each of duplicate process variables to be collected.

29. The computer program product of claim 21 wherein said computer readable program code means causing said computer to format said data collection results for said plurality of host systems comprises:
  creating messages in formats suitable for said plurality of host systems; and
  classifying said data received into groups as requested by said plurality of host systems.

30. The computer program product of claim 21 wherein said computer readable program code means causing said computer to send said formatted said data collection results to said plurality of host systems comprises sending said data at a requested time interval.

31. The computer program product of claim 21 wherein said primary messages comprise alarm messages or events messages.

32. A method for local data sampling comprising:
  a) receiving from a host system a request to collect data on a piece of processing equipment for a data sampling group;
  b) formatting a request for said data;
  c) sending said formatted request to said piece of processing equipment;
  d) thereafter receiving said data from said piece of processing equipment;
  e) formatting said data received;
  f) sending said formatted data to said host system at a requested time interval; and
  g) repeating steps c through f
until a defined number of data sets have been sent to said host system or until receiving from said host system a request to stop data sampling for said data sampling group.

33. The method of claim 32 wherein said formatting said request for said data comprises:
  creating a message in a format suitable for said piece of processing equipment; and
  including only one copy of each of duplicate process variables to be collected.

34. The method of claim 32 wherein said formatting said data received comprises:
  creating a message in a format suitable for each host system; and
  classifying said data received into groups as requested by said host system.

35. The method of claim 32 wherein said sending said requested data to said host system comprises sending said data at a requested time interval.

36. The method of claim 32 further comprising:
  receiving primary messages from said pieces of processing equipment; and
  sending said primary messages to each of a list of applications interested in said primary messages.

37. The method of claim 36 further comprising:

checking if each of said primary messages has an auto-reply option turned on;

formatting each of said primary messages into a format suitable for each of said interested applications;

setting to zero a reply bit in each of said formatted messages before sending said formatted messages to said interested applications; and sending an auto-reply message to said piece of processing equipment for each of said messages having said auto-reply option turned on.

38. The method of claim 36 wherein said primary messages comprise alarm messages or events messages.

39. A method for group data polling comprising:

receiving from a host system a request to collect data on a piece of processing equipment for one or more data sampling groups;

for each data sampling group for which a request to stop collecting data has not been received:

a) formatting a request for said data;

b) sending said formatted request to said piece of processing equipment;

c) thereafter receiving said data from said piece of processing equipment and classifying said received data into said data sampling groups;

d) formatting said data received;

e) sending said formatted data to said host system at a requested time interval; and f) repeating steps b through e until a defined number of data sets have been sent to said host system or until receiving from said host system a request to stop data sampling for said all of said data sampling groups.

40. The method of claim 39 wherein said formatting said request for said data comprises:

creating a message in a format suitable for said piece of processing equipment; and including only one copy of each of duplicate process variables to be collected.

41. The method of claim 39 wherein said formatting said data received comprises:

creating a message in a format suitable for each host system; and classifying said data received into groups as requested by said host system.

42. The method of claim 39 wherein said sending said requested data to said host system comprises sending said data at a requested time interval.

43. The method of claim 39 further comprising:

receiving primary messages from said pieces of processing equipment; and sending said primary messages to each of a list of applications interested in said primary messages.

44. The method of claim 43 further comprising:

checking if each of said primary messages has an auto-reply option turned on;

formatting each of said primary messages into a format suitable for each of said interested applications;

setting to zero a reply bit in each of said formatted messages before sending said formatted messages to said interested applications; and sending an auto-reply message to said piece of processing equipment for each of said messages having said auto-reply option turned on.

45. The method of claim 43 wherein said primary messages comprise alarm messages or events messages.

* * * * *